Figure 1:
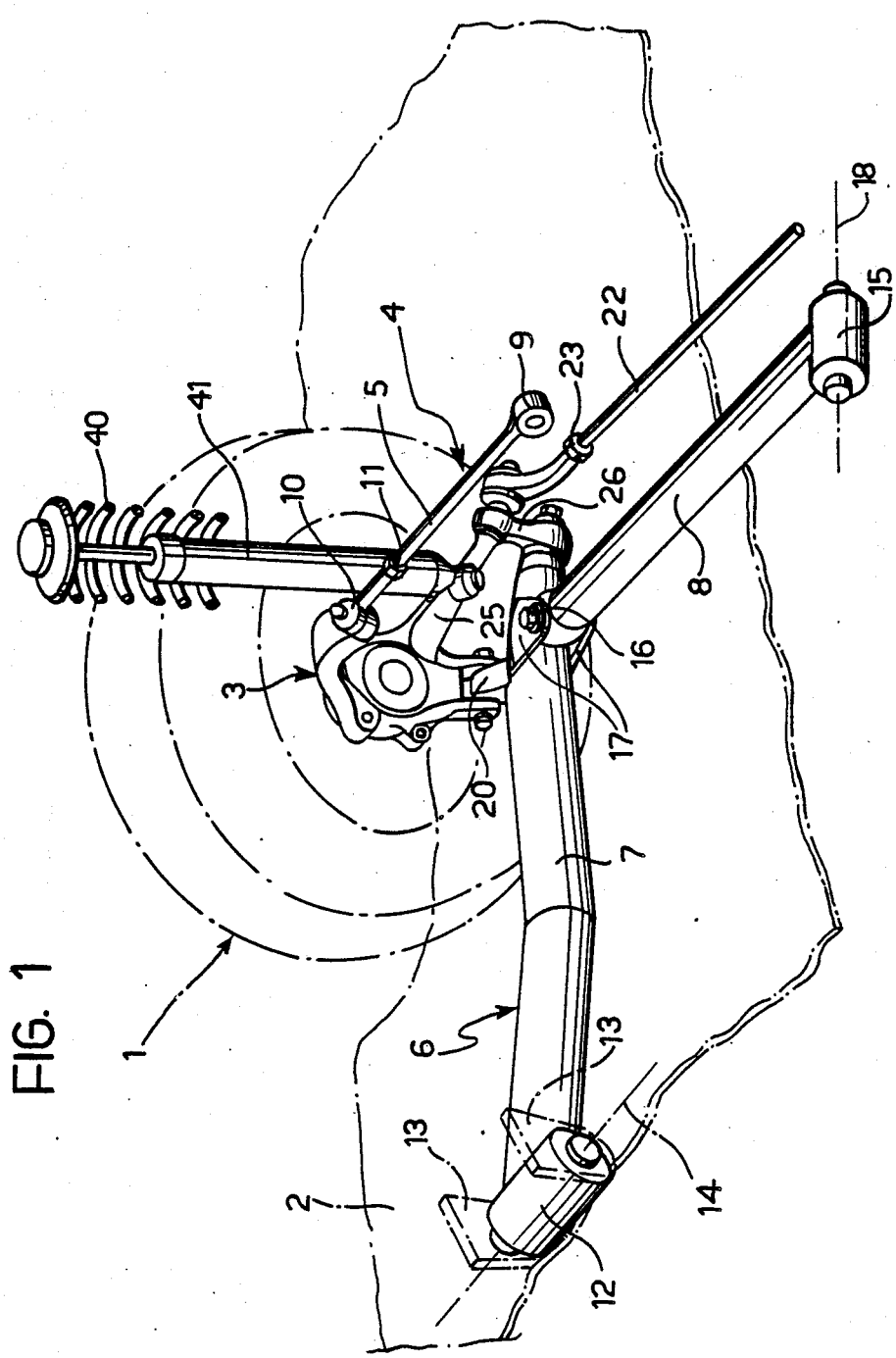

United States Patent [19]

Alesso et al.

[11] Patent Number: 4,903,981
[45] Date of Patent: Feb. 27, 1990

[54] REAR SUSPENSION FOR MOTOR VEHICLES OF THE TYPE WITH INDEPENDENT WHEELS WITH TRANSVERSE QUADRILATERALS

[75] Inventors: Guido Alesso, Savigliano; Gian Luigi Perello, Strambino; Raffaele Leonardis, Turin, all of Italy

[73] Assignee: Fiat Auto S.p.A., Turin, Italy

[21] Appl. No.: 292,152

[22] Filed: Dec. 30, 1988

[30] Foreign Application Priority Data

Dec. 30, 1987 [IT] Italy ................. 68147-A/87

[51] Int. Cl.⁴ .............................. B62D 5/00
[52] U.S. Cl. ..................... 280/691; 280/91; 280/661
[58] Field of Search ............ 280/91, 661, 688, 696, 280/691, 690

[56] References Cited

U.S. PATENT DOCUMENTS

| | | | |
|---|---|---|---|
| 4,709,935 | 12/1987 | Takizawa et al. | 280/91 |
| 4,747,614 | 5/1988 | Kuroyanagi et al. | 280/661 |
| 4,799,703 | 1/1989 | Mueller et al. | 280/91 |
| 4,805,940 | 2/1989 | Ohno et al. | 280/91 |

FOREIGN PATENT DOCUMENTS 23775 2/1984 Japan ........................ 280/91

Primary Examiner—Charles A. Marmor
Assistant Examiner—Michael Mar
Attorney, Agent, or Firm—Sughrue, Mion, Zinn, Macpeak & Seas

[57] ABSTRACT

A rear suspension for motor vehicles with independent wheels is described, in which the support (3) for each wheel (1) is connected to the structure (2) of the motor vehicle by means of an articulated quadrilateral system including an upper transverse member and a lower transverse member. The upper transverse member is constituted by a single transverse arm (5) articulated by a ball joint (10) to the wheel support (3). The lower transverse member is constituted by a triangular structure (6) comprising a main lower arm (7) and an auxiliary lower arm (8). This structure is also articulated to the wheel support (3) by means of a ball joint (20) which defines, together with the ball joint (10) of the upper transverse arm (5), a steering axis of the wheel. The wheel support (3) is also provided with a projecting arm (25) to which a steering control rod (22) is connected and which is in turn connected to the lower triangular structure by means of a connecting rod member (26).

7 Claims, 6 Drawing Sheets

REAR SUSPENSION FOR MOTOR VEHICLES OF THE TYPE WITH INDEPENDENT WHEELS WITH TRANSVERSE QUADRILATERALS

DESCRIPTION

The present invention relates to rear suspensions for motor vehicles, of the type with independent wheels, in which the support for each wheel is connected to the structure of the motor vehicle by means of an articulated quadrilateral system including an upper transverse member and a lower transverse member.

The object of the present invention is to provide a rear suspension which is usable both with non-steered wheels and with steered wheels, which ensures the stability and road-holding of the motor vehicle, and which at the same time enables the kinematic movements and resilient yielding of the suspension to be controlled in an independent manner.

In order to achieve this object, the invention provides a rear suspension of the type indicated above, characterised by the combination of the following characteristics:

(a) the upper transverse member is constituted by a single transverse arm having one end articulated to the structure of the motor vehicle and its opposite end articulated by a ball joint to the wheel support, (b) the lower transverse member is constituted by a triangular structure including a main lower arm and an auxiliary lower arm connected to the main lower arm, (c) the two lower arms have ends articulated to the motor vehicle structure with the interposition of bushes of resiliently deformable material, (d) the lower triangular structure is connected to the wheel support by means of a ball joint articulation which—together with the ball joint articulation of the upper transverse arm—defines a steering axis of the wheel, (e) the wheel support is provided with a projecting arm to which a steering control rod is connected, (f) the projecting arm of the wheel support is connected to the main lower arm by a connecting rod member.

Figure 2:
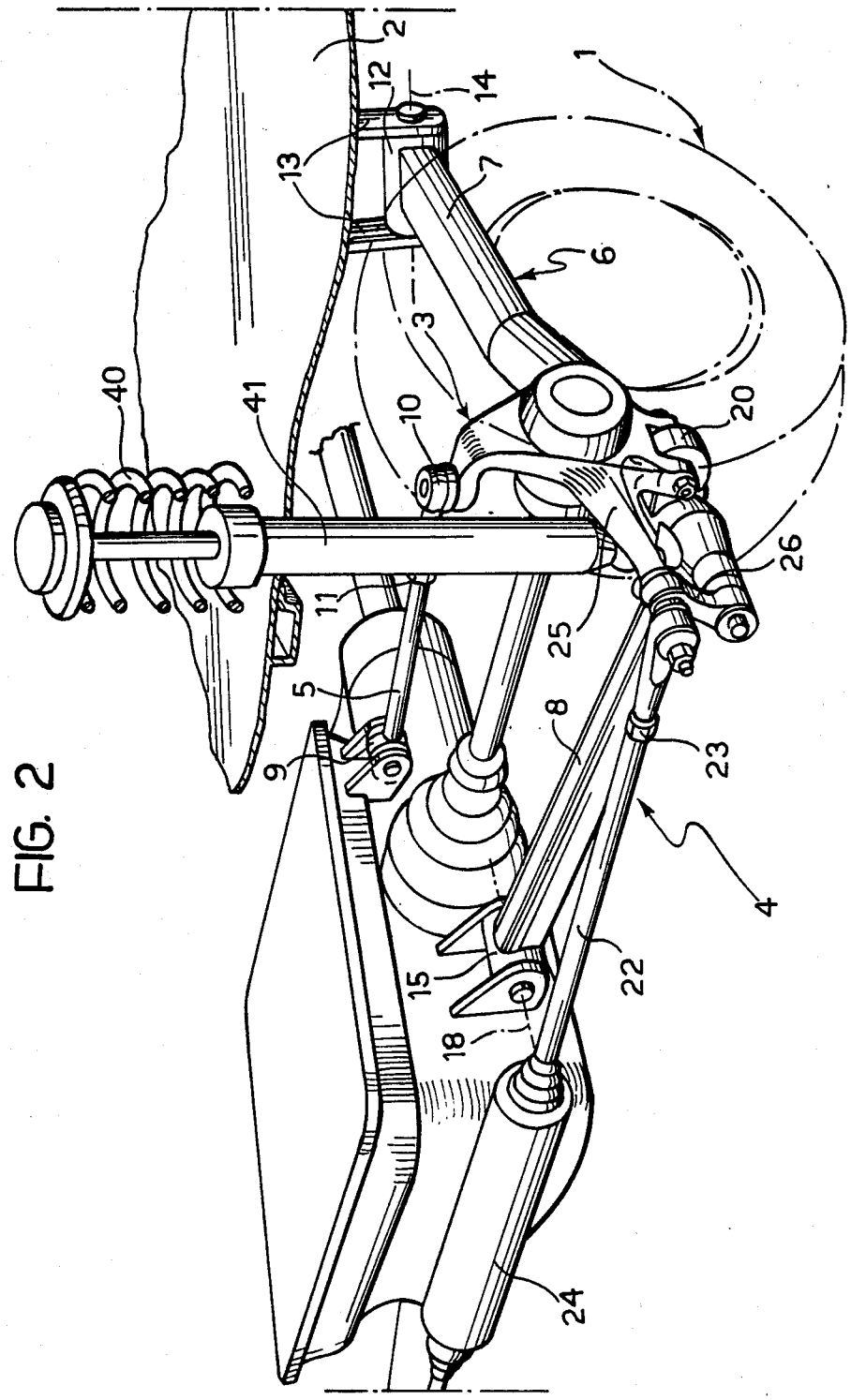
Figure 3:
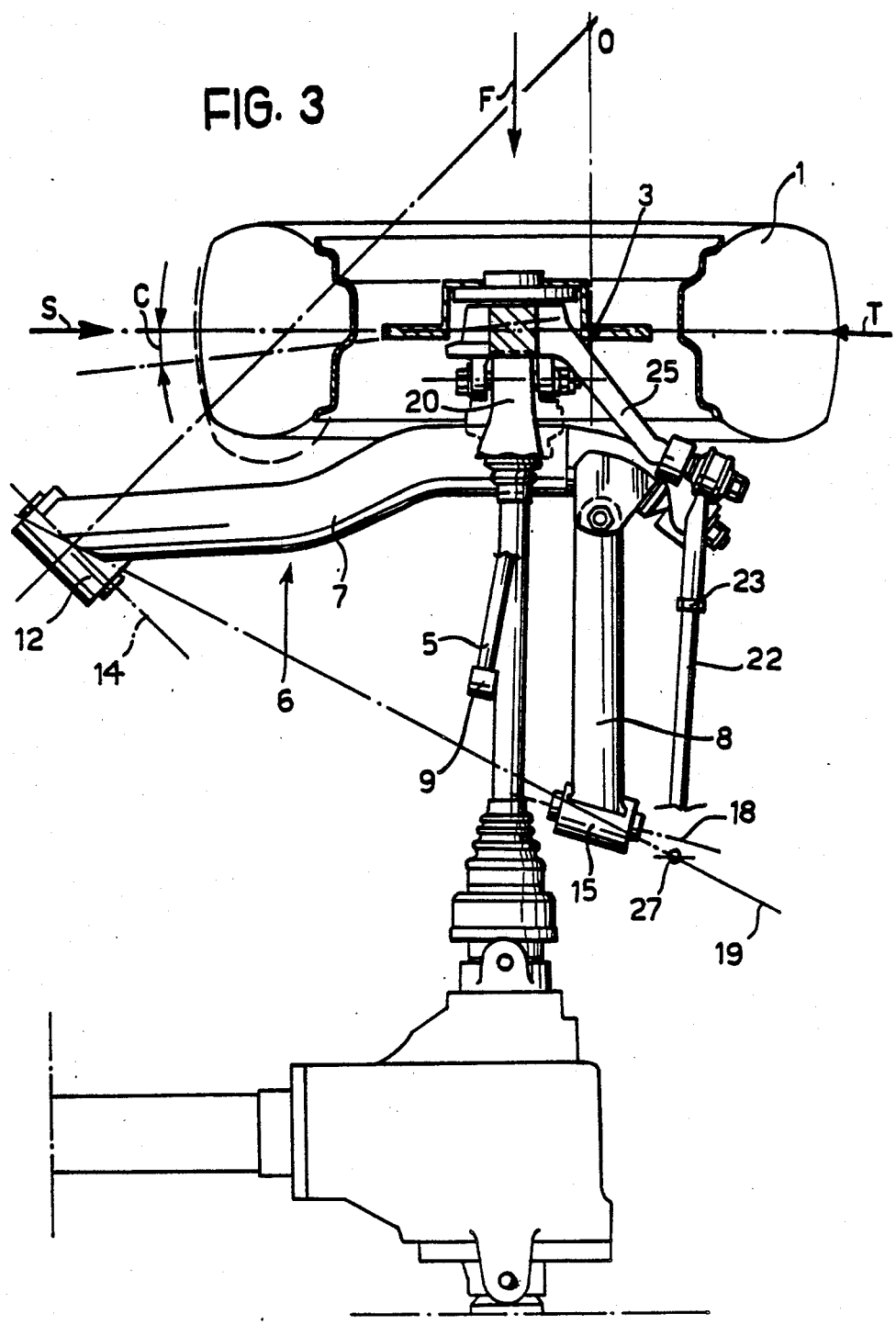
Figure 4:
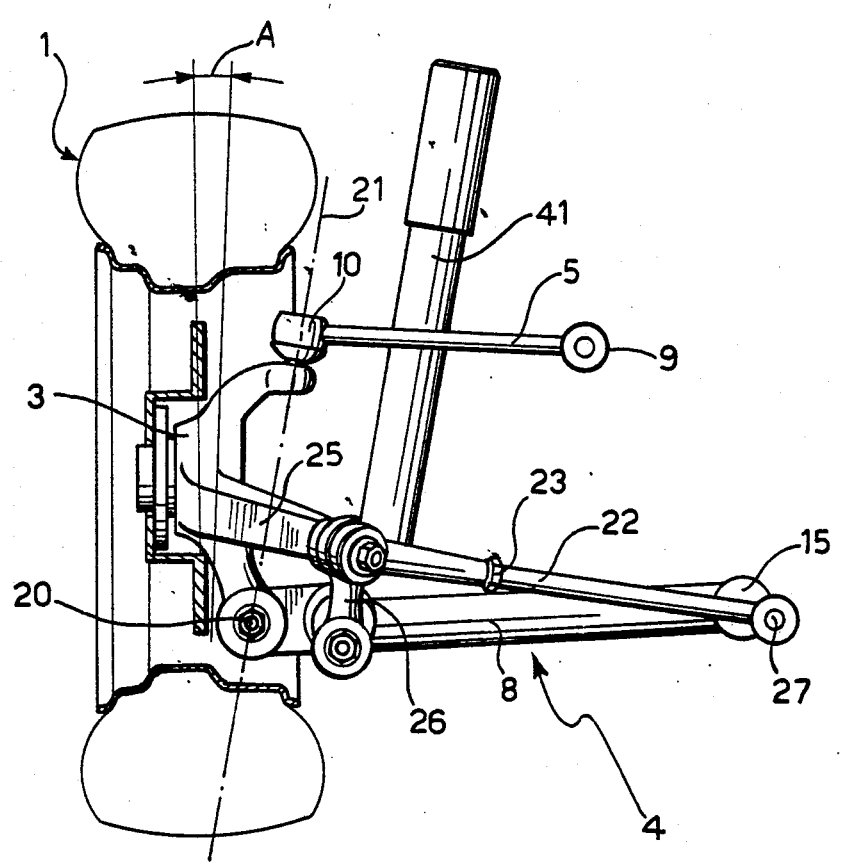
Figure 5:
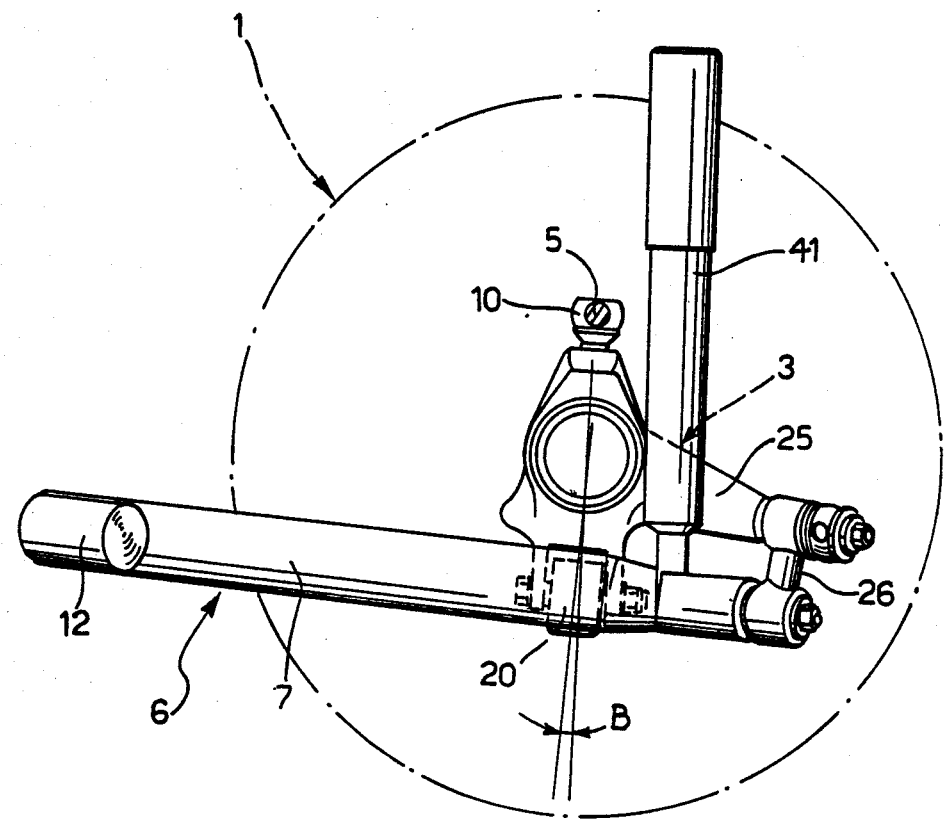
Figure 6:
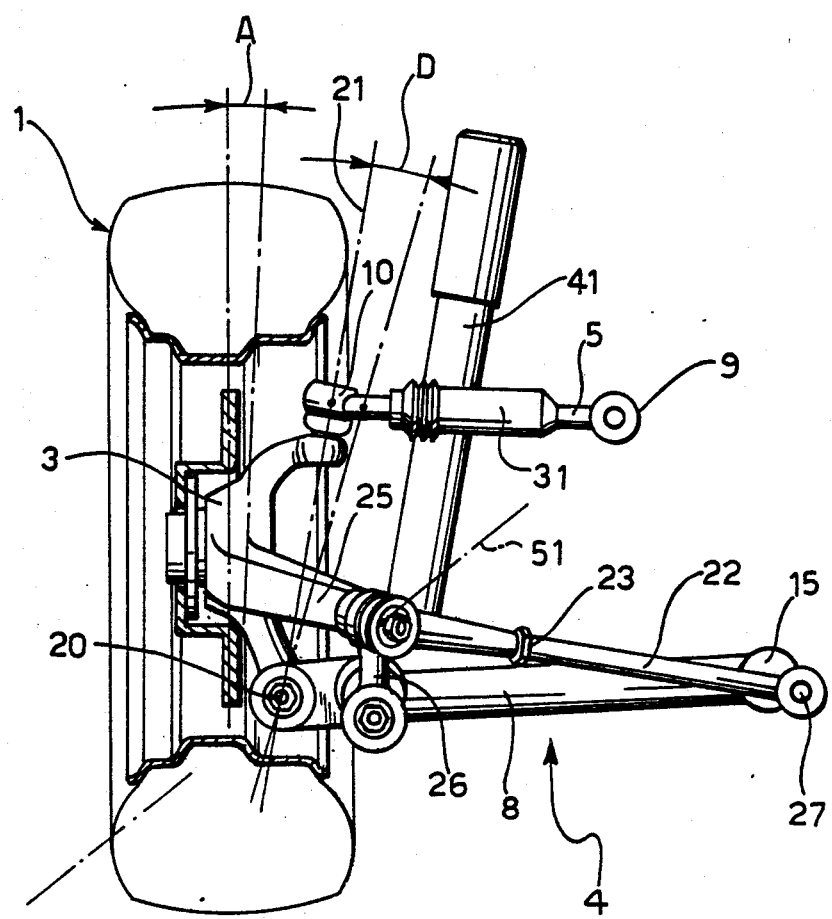

The invention will now be described with reference to the appended drawings, provided purely by way of non-limiting example, in which:

FIG. 1 is a schematic partial perspective view of the suspension of the invention, FIG. 2 illustrates another perspective view of the suspension of FIG. 1, FIGS. 3 to 5 illustrate respectively a plan view, a rear view and a side view of the suspension of FIG. 1 and FIG. 6 illustrates a variant of FIG. 4.

The drawings illustrate solely the part of the suspension associated with the right-hand rear wheel of the motor vehicle. The left-hand part of the suspension is symmetrical with respect to that illustrated.

In the drawings, the right-hand rear wheel of a motor vehicle whose structure is indicated 2 is indicated 1. The wheel 1 is mounted on a support 3 which is connected to the structure 2 by means of an articulated quadrilateral system, generally indicated 4. The articulated quadrilateral system 4 includes an upper transverse member constituted by a single transverse arm 5 and a lower transverse member 6 constituted by a triangular structure defined by a main lower arm 7 and an auxiliary arm 8 connected to the arm 7 in the manner which will be described in detail below. In accordance with the terminology usually adopted by experts in the art, the term "transverse" is used in the present description and in the following claims to indicate a horizontal direction substantially inclined to the longitudinal axis of the motor vehicle. In the case of the main lower arm 7, one is not talking properly of a transverse arm in that it is disposed in a direction almost parallel to the longitudinal direction of the motor vehicle. However, the triangular structure defined by the combination of the arm 7 and the arm 8 is equivalent to a transverse arm.

The upper transverse arm 5 has one end 9 articulated to the structure of the motor vehicle and its opposite end 10 connected to an upper limb of the wheel support 3 (which is substantially C-shaped, as clearly seen in FIG. 4). The length of the transverse arm 5 is adjustable by means of an adjustment device 11 including a threaded coupling which is not illustrated in detail since it is of known type. In the variant of FIG. 6, a fluid actuator 31 is provided for controlling the length of the arm 5, instead of the device 11.

The main lower arm 7 has a tubular sheet-metal structure the front end of which (with reference to the direction of forward movement of the motor vehicle) is welded a metal tube 12. The tube 12 contains a resilient bush mounted on a pin carried by the substructure 2 (for example, by means of two flanges 13 as illustrated in FIG. 1. The articulation axis of the bush is indicated 14 in the drawings (see particularly FIG. 3). The auxiliary lower arm 8 also has a tubular sheet-metal structure welded at one end to a metal tube 15 which is articulated on a pin carried by the substructure of the motor vehicle with the interposition of a rubber bush. The opposite end of the arm 8 is articulated about a vertical-axis bush 16 carried by two flanges 17 welded to the main lower arm 7. The articulation axis of the bush 15 is indicated 18 in the drawings (see particularly FIG. 3). With reference to FIG. 3, the two bushes 12, 15 define an axis 19 of pivoting of the lower triangular structure 6. The main lower arm 7 is also connected to the lower limb of the wheel support 3 by a ball joint 20. The two ball joints 10, 20 (see FIG. 4) define a steering axis 21 of the rear wheel 1. The steering is controlled by means of a steering rod 22 provided with an adjustment device 23 for adjusting its length. The rod 22 is controlled at one end by an actuator 24 (FIG. 2) and is connected in an articulated manner at its opposite end to an arm 25 projecting from the wheel support 3 and forming part thereof. In the variant of FIG. 6, the actuator 24 is not essential in that the steering can be controlled by the actuator device 31, thus becoming dependent on the variation in camber. Obviously, however, it is possible to use both actuators 24, 31. The arm 25 of the wheel support 3 is connected to the lower end of the main lower arm 7 by a connecting rod member 26. The member 26 has its ends articulated in a jointed manner to the arm 25 and the arm 7 respectively.

The suspension according to the invention is usable both with non-driven rear wheels and with driven rear wheels. In the latter case (FIG. 2) the supports connecting the transverse arms 5, 8 may be supported by the structure of the rear differential of the motor vehicle.

During movement of the motor vehicle, the vertical displacements of the wheel relative to the motor vehicle structure may occur by virtue of the oscillation of the articulated quadrilateral system constituted by the upper arm 5 and the lower triangle 6. During travel of the motor vehicle around bends, the rear wheels are steered by means of the actuator device 24 and the rod 22 which controls rotation of the support 3 about the axis 21 (FIG. 4). At the same time, since the support 3 is also connected to the lower arm 7 by the connecting rod member 26, the latter means that, when the support 3 rotates about the axis 21, it also changes its orientation in space whereby the angle of incidence (indicated B in FIG. 5) and the angle of camber, indicated A in FIG. 4, of the wheel are varied. This enables the suspension to be designed so as to obtain a desired behaviour of the suspension itself during travel. The connecting rod member 26 then takes on the function of reacting to torques with transverse axes and to vertical loads acting on the support 3.

Naturally, the angles of the wheel may also be adjusted during the setting-up phase by means of the adjustment devices 11 and 23 for adjusting the lengths of the upper arm 5 and the control rod 23. In particular, the camber angle of the wheel may be adjusted by a variation of the length of the upper arm 5, while the angle of convergence (indicated C in FIG. 3 with reference to the position of the wheel illustrated in broken outline) may be regulated by a variation of the rod 22.

As already indicated, in the variant of FIG. 6, the actuator 31 controls both the camber and the steering of the wheel. The variation in length of the arm 5 rotates the axis 21 through an angle D (FIG. 6) about the axis 51 passing through the joint 20 and through the joint between the rod 22 and the arm 25. This results in steering of the wheel.

When (FIG. 3) the articulated end of the rod 22 on the body side is located at a point 27 which lies in the centre of rotation of the system, vertical movements of the wheel during travel of the motor vehicle do not cause rotation of the support 3 about the steering axis 21 or consequent variation of the angle of convergence. Naturally, however, it may be arranged that, by placing the point 27 at a distance from the centre of rotation, a desired variation of the angle of convergence is obtained as a result of vertical movements of the wheel.

With reference to the travel of the motor vehicle around bends, a transverse load F (FIG. 3) applied to the wheel support 3 as a result of the travel round the bend generates a rotation of the lower triangle 6 about the centre of rotation O (FIG. 3) defined by the intersection with the axis 28 of the normal to the axis 14 in correspondence with the bush 12. The sense of rotation is such that the convergence of the wheels increases in the bend, improving stability. This rotation takes place as a result of a deformation in an axial sense of the rubber bush located in correspondence with the articulation 12 (in the case illustrated in FIG. 3, the rotation is in an anti-clockwise sense).

During braking, the resulting force S applied to the support 3 also causes rotation (in an anti-clockwise sense with reference to FIG. 3) about the centre of rotation O with a consequent increase in convergence (always to the advantage of stability). During acceleration, which causes the application of a force T, there is the opposite effect.

A helical spring and a shock-absorbing cylinder interposed between the arm 25 and the body 2 are indicated 40, 41.

Naturally, the principle of the invention remaining the same, the constructional details and forms of embodiment may be varied widely with respect to that described and illustrated purely by way of example, without thereby departing from the scope of the present invention.

We claim:

1. A rear suspension for motor vehicles, of the type with independent wheels, in which the support (3) for each wheel (1) is connected to the structure (2) of the motor vehicle by means of an articulated quadrilateral system (4) including an upper transverse member (5) and a lower transverse member (6), characterised by the combination of the following characteristics:
   (a) the upper transverse member (5) is constituted by a transverse arm having one end articulated to the structure of the motor vehicle (2) and its opposite end articulated by a ball joint (10) to the wheel support (3),
   (b) the lower transverse member is constituted by a triangular structure (6) including a longitudinally extending main lower arm (7) and a transversely extending auxiliary lower arm (8) to the main lower arm (7),
   (c) the two lower arms (7, 8) have ends (12, 15) articulated to the motor vehicle structure (2) with the interposition of bushes of resiliently deformable material,
   (d) the portion of the lower triangular structure (6) formed by the connection between the two lower arms is connected to the wheel support (3) by means of a ball joint articulation (20) which, together with the ball joint articulation (10) of the upper transverse arm, defines a steering axis (21) of the wheel (1),
   (e) the wheel support (3) is provided with a projecting arm (25) to which a steering control rod (22) is connected, and
   (f) the projecting arm (25) of the wheel support (3) is connected to the main lower arm (7) by a connecting rod member (26).

2. A rear suspension according to claim 1, characterized in that the connecting rod member (26) is articulated to the end of the main lower arm (7) opposite the end of the main lower arm articulated to the motor vehicle structure.

3. A rear suspension according to claim 1, characterised in that the auxiliary lower arm (8) is articulated to the main lower arm (7).

4. A rear suspension according to claim 1, characterised in that the wheel support (3) is generally C-shaped with an upper limb connected to the upper transverse arm (5) and a lower limb connected by the ball joint (20) to an appendage of the main lower arm (7).

5. A rear suspension according to claim 1, characterised in that the upper transverse arm (5) is of adjustable length.

6. A rear suspension according to claim 1, characterised in that the control rod (22) is of adjustable length.

7. A rear suspension according to claim 1, characterised in that the upper transverse arm (5) includes a fluid actuator (31) for controlling its length.

* * * * *